Dec. 30, 1930.   J. CAMPBELL   1,787,305
SHIPPING CONTAINER OR BOX FOR MOTOR VEHICLES AND THE LIKE
Filed May 31, 1927   3 Sheets-Sheet 1
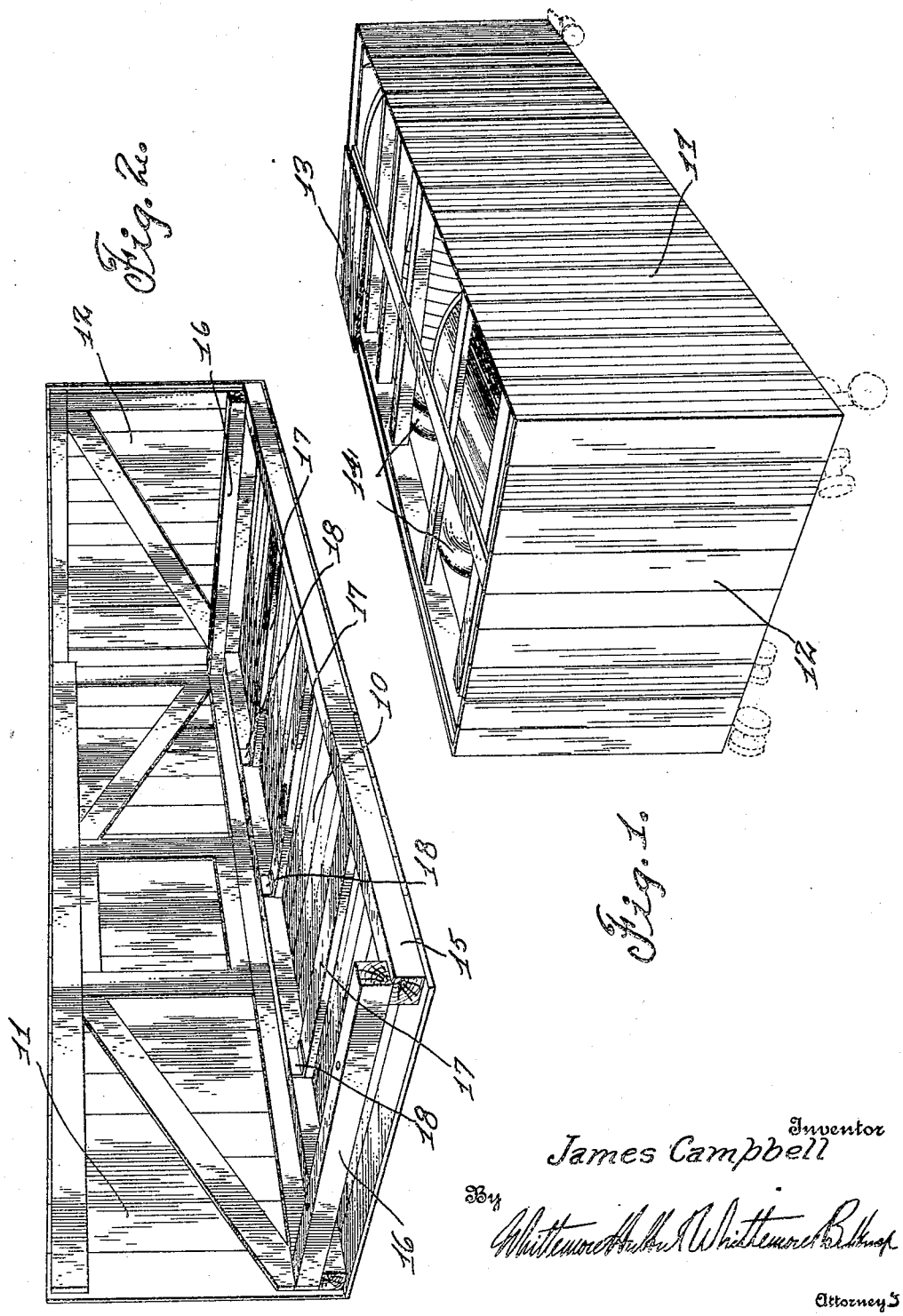
Inventor
James Campbell
By
Whittemore Hulbert Whittemore Belknap
Attorneys

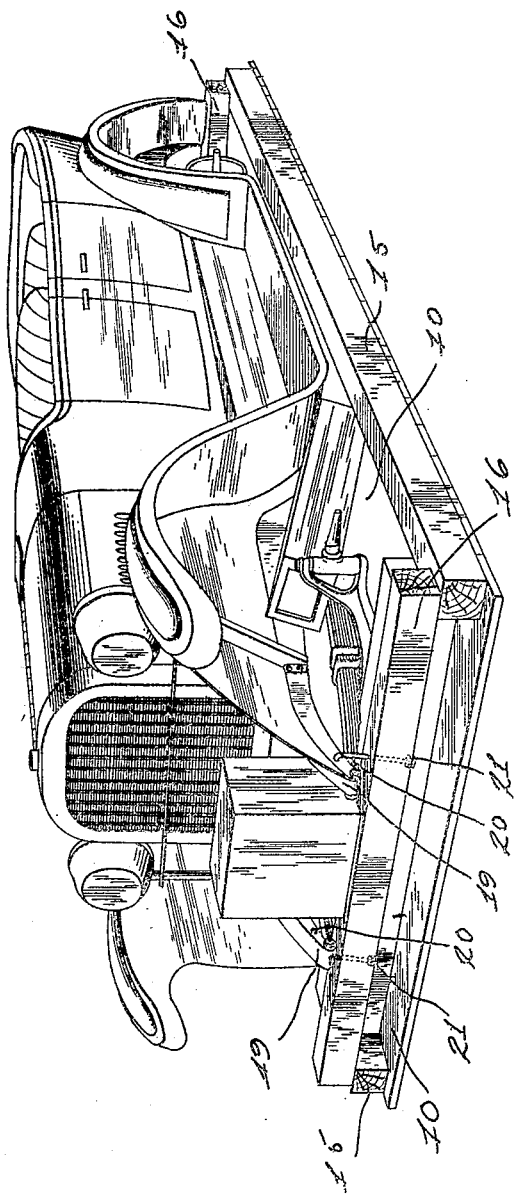

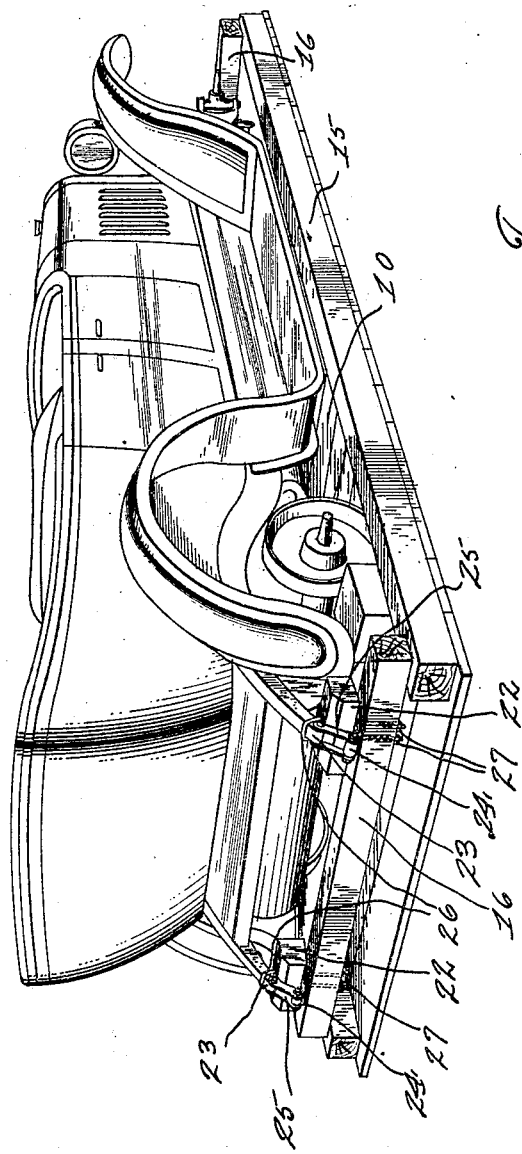

Patented Dec. 30, 1930

1,787,305

UNITED STATES PATENT OFFICE

JAMES CAMPBELL, OF DETROIT, MICHIGAN, ASSIGNOR, BY MESNE ASSIGNMENTS, TO CHRYSLER CORPORATION, A CORPORATION OF DELAWARE

SHIPPING CONTAINER OR BOX FOR MOTOR VEHICLES AND THE LIKE

Application filed May 31, 1927. Serial No. 195,486.

This invention relates to shipping containers or boxes for motor vehicles and the like and has as its objects to simplify, render more efficient and improve generally devices of this character.

The invention finds particular utility in boxing or crating motor vehicles and involves numerous advantages over the present method now employed. In shipping automobiles, particularly when such vehicles are to be exported, it is customary to enclose the vehicle in a crate or box. Inasmuch as the freight rates are dependent principally, if not entirely, upon the amount of space the boxed vehicles require rather than the weight, it is important, from the standpoint of economy, to house the vehicle in a crate or box of dimensions as small as possible.

Heretofore, it has generally been the practice to support the vehicle within the crate or box by means of blocks or other supporting means engaging the ends of the axles. While this has been generally satisfactory it has, nevertheless, been necessary to provide sufficient clearance within the box to permit of any movement of the body resulting from a flexing of the springs because under such conditions, while the axles were rigidly secured in place, the body was permitted to oscillate or move to the extent permitted by the springs. With such known methods of boxing vehicles damage has resulted to the steering wheel and parts of the body occasioned by the impact of these parts against the top of the crate.

Furthermore in shipping boxes of this character it has heretofore been necessary to provide means on the bottom to distribute the weight when the box is mounted upon trucks or casters for handling prior to storage in the freight car or ship and after arrival at the destination. With the type of crates heretofore used these reinforcing members or skids have, of necessity, been secured to the outer side of the bottom of the box because of the lack of space within the box. Such a practice obviously increased the overall dimensions of the crate and justified a higher freight rate.

It is therefore, one of the primary objects of this invention to provide a box or crate together with means for rigidly mounting and securing the vehicle within the crate whereby it is possible to enclose or box the vehicle in a crate of smaller dimensions. To this end the invention contemplates the provision of supporting members arranged within the box and extending transversely thereof adjacent the ends whereby the ends of the frame of the vehicle may rest upon these members and be rigidly secured thereto. In this manner the vehicle is rigidly positioned so that there is no relative oscillation or movement between the crate and the vehicle. These supporting members are preferably spaced from the bottom of the crate, first, to facilitate the placement of attaching bolts connecting the frame to the supporting member and secondly, to support the vehicle a sufficient distance above the bottom of the box to provide clearance for the two lowest points of the vehicle, namely, the bottom of the rear axle housing and the bottom of the front axle. Furthermore by securely fastening the ends of the vehicle frame to these cross members at the ends of the box, the frame acts to strengthen the box and prevents undue wearing or distortion thereof.

In addition to the advantages just enumerated, it is possible, with such a method of boxing, to leave the hub assemblies upon the spindles, where disk wheels are used, and eliminates the necessity of draining the dope from the transmission and the rear axle because crates of this character are designed to always rest upon the bottom. Furthermore sufficient clearance is provided to locate the skids within the box where they are secured to the top surface of the bottom. Thus the space usually required for these skids when they are arranged exteriorly of the box is saved.

It is obvious that a further advantage is obtained that freight cars and ships may be loaded heavier because it is possible to pack therein more crates than has heretofore been possible. Furthermore unboxing of the machines is simplified as the tops and sides may be removed with the vehicle resting on its fastenings in the bottom whereupon the machine may be raised and the wheels assembled from this position.

The several objects, advantages and novel details of construction of this invention will be made more apparent as this description proceeds, especially when considered in connection with the accompanying drawings, wherein:

Figure 1 is a perspective view of a crate partially complete showing the top section thereof partly broken away.

Figure 2 is a perspective view of the crate showing the bottom with one side and one end thereof in place.

Figure 3 is a perspective view showing the bottom of the crate with the vehicle mounted thereon and showing particularly the connection between the front ends of the vehicle frame and the crate bottom, and Figure 4 is a similar view showing the connection between the other ends of the vehicle frame and the crate bottom.

Referring now particularly to the drawings wherein like reference characters indicate like parts, it will be noted that the crate or box consists of a bottom 10, sides 11, ends 12 and a top 13. The particular manner in which the sides and ends are connected to the bottom 10 and the sides, ends and top to one another is of little consequence and forms no particular part of this invention. However the wheels 14 may be secured to the sides thus providing a convenient manner for rigidly locating and carrying the wheels within the crate.

The bottom 10, which may consist of matched sheathing, is longitudinally reinforced by beams or frame members 15 extending along and secured to the longitudinal edges thereof. Secured to the ends of these beams 15 and supporting members 16 which may rest upon and be secured to the ends of the beams 15 to be thus spaced above the bottom 10, as most clearly illustrated in Figure 2. Also extending transversely of the bottom and at longitudinally spaced intervals are reinforcing members or skids 17 and in the form of construction herein described, and best shown in detail in Figure 2, these skids are secured to the frame members 15 by means of angular plates 18.

The supporting members 16 are adapted to support the ends of the frame of the vehicle and in Figure 3 it will be noted that the forward ends 19 of the vehicle chassis or frame rest upon the supporting member 16 arranged at that end of the crate. These ends of the vehicle frame are rigidly secured to the supporting member 16 by means of bolts 20 which engage apertures in these ends of the frame and pass downwardly through apertures in the supporting members 16 where they receive nuts 21. The apertures in the frame with which the bolts 20 engage are preferably, although not necessarily, the apertures normally provided for receiving the bolts which connect the front bumper to the frame.

In Figure 4 the connection between the rear end of the frame and the other supporting member 16 is illustrated at this point. It is usually necessary to insert chuck blocks 22 between the end 23 of the frame and the end of spring 24 whereupon any relative movement which would otherwise be permitted by the shackles 25 is prevented. After this, U-bolts 26 are passed over the end of the frame and downwardly through aligned apertures in the chuck block 22 and supporting member 16 whereupon nuts 27 are threaded onto the lower ends thereof to also secure the rear ends of the frame to the supporting member 16. Obviously the U-bolts 26 will also straddle the springs 24.

By spacing the supporting member 16 above the bottom 10 of the crate it is possible to extend the securing bolts through the supporting member and to thread nuts on the lower ends thereof. Furthermore by so spacing the supporting members 16 sufficient clearance is provided to accommodate the lowest points on the front and rear axles as has previously been pointed out. Furthermore there is sufficient clearance for the skids 17, which as shown in Figure 2, are arranged inside the crate.

It will be obvious that the space within the crate and around the vehicle may be utilized for the storage of such accessories and appurtenances as it is necessary or advisable to remove from the vehicle prior to storage and as previously mentioned, the four wheels may be conveniently mounted upon the sides of the box. With the forward and rear ends of the frame of the vehicle rigidly secured to the supporting members 16, which in turn form an integral part of the construction, it will be obvious that no relative movement or oscillation between the vehicle and crate is permitted. This not only makes it unnecessary to provide a crate large enough to permit such oscillation but relieves the springs from any damage or strain which might be occasioned thereto as a result of such oscillations and so eliminates the possibility of any damage to the vehicle occasioned by contact with the crate. Furthermore with such an arrangement the vehicle frame acts to reinforce and strengthen the crate or box as will be obvious.

While an embodiment of the invention has been described and illustrated herein somewhat in detail, it will be apparent to those skilled in this art that various changes in many of the essential and all of the non-essential details illustrated may be resorted to without departing from the spirit and scope of this invention and to this end reservation is made to make such changes as may come within the purview of the accompanying claims.

What I claim as my invention is:

1. In a shipping box for motor vehicles and the like having a bottom, the combination with said bottom, of supporting members adjacent the ends of the box mounted upon and in spaced relation to said bottom whereby the vehicle may be rigidly supported through the frame thereof by the ends of said frame resting on said supporting members, and means for securing the ends of said frame to said supporting members.

2. In a shipping box for motor vehicles and the like including a bottom, transversely extending supporting members secured in spaced relation to said bottom at the ends thereof, the vehicle being rigidly supported by said members with the ends of the vehicle frame resting thereon, and bottom reinforcing skids secured thereto at the inside of said box.

3. A shipping box for motor vehicles and the like including sides, ends, a top and a bottom, supporting members extending transversely of the box at the ends of said bottom, means for rigidly securing said members to said bottom in spaced relation thereto, the vehicle being rigidly supported by said members with the ends of the vehicle frame resting thereon, and tie bolts engaging said frame and extending through said supporting members for securing the frame thereto.

In testimony whereof I affix my signature.

JAMES CAMPBELL.